Oct. 5, 1937.  M. A. ARÓSTEGUI  2,094,575
HEATING MEANS FOR SEATS
Filed July 31, 1936   3 Sheets-Sheet 1
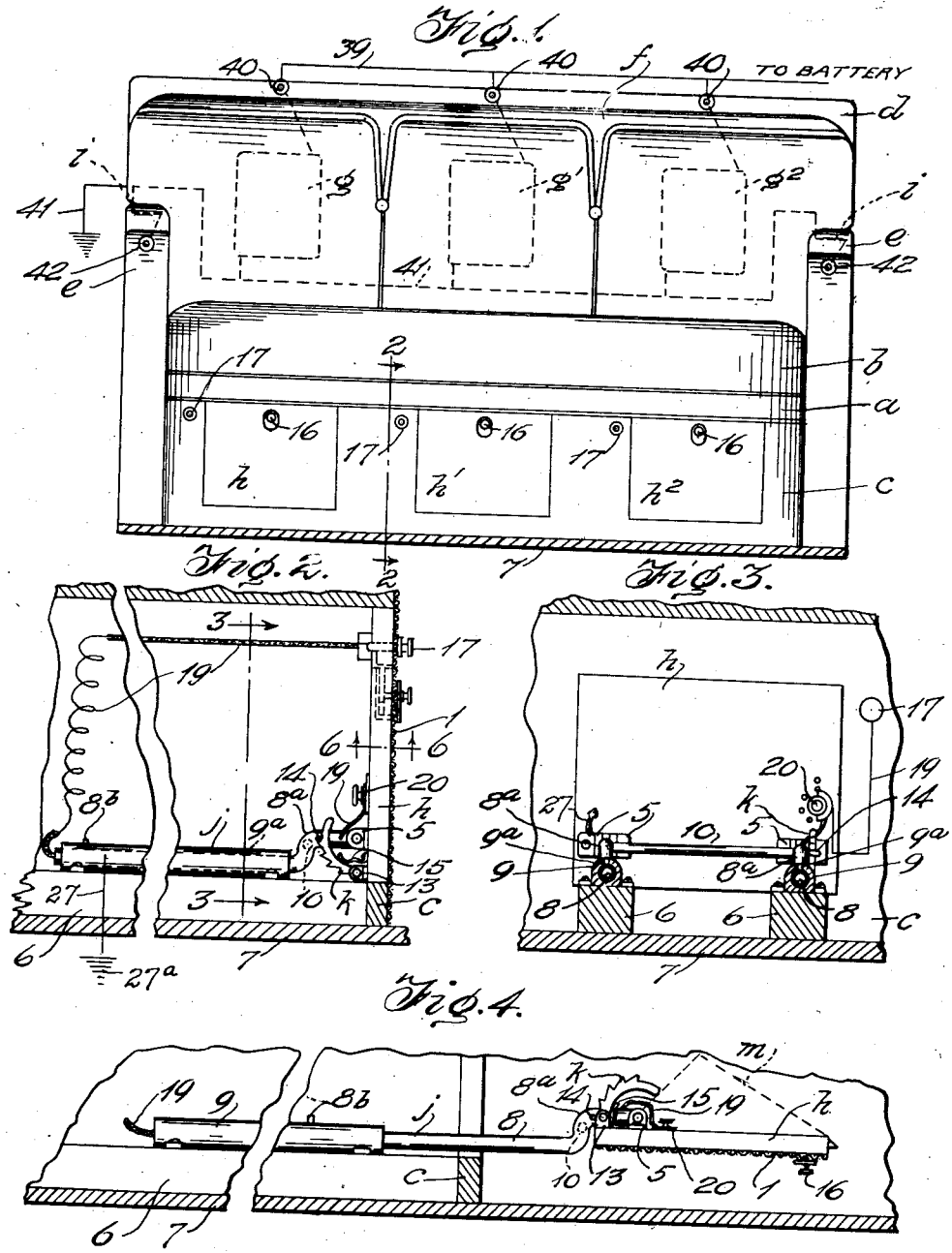
INVENTOR.
Maria A. Aróstegui,
BY Robert Watson
ATTORNEY.

Oct. 5, 1937.	M. A. ARÓSTEGUI	2,094,575
HEATING MEANS FOR SEATS
Filed July 31, 1936	3 Sheets-Sheet 2
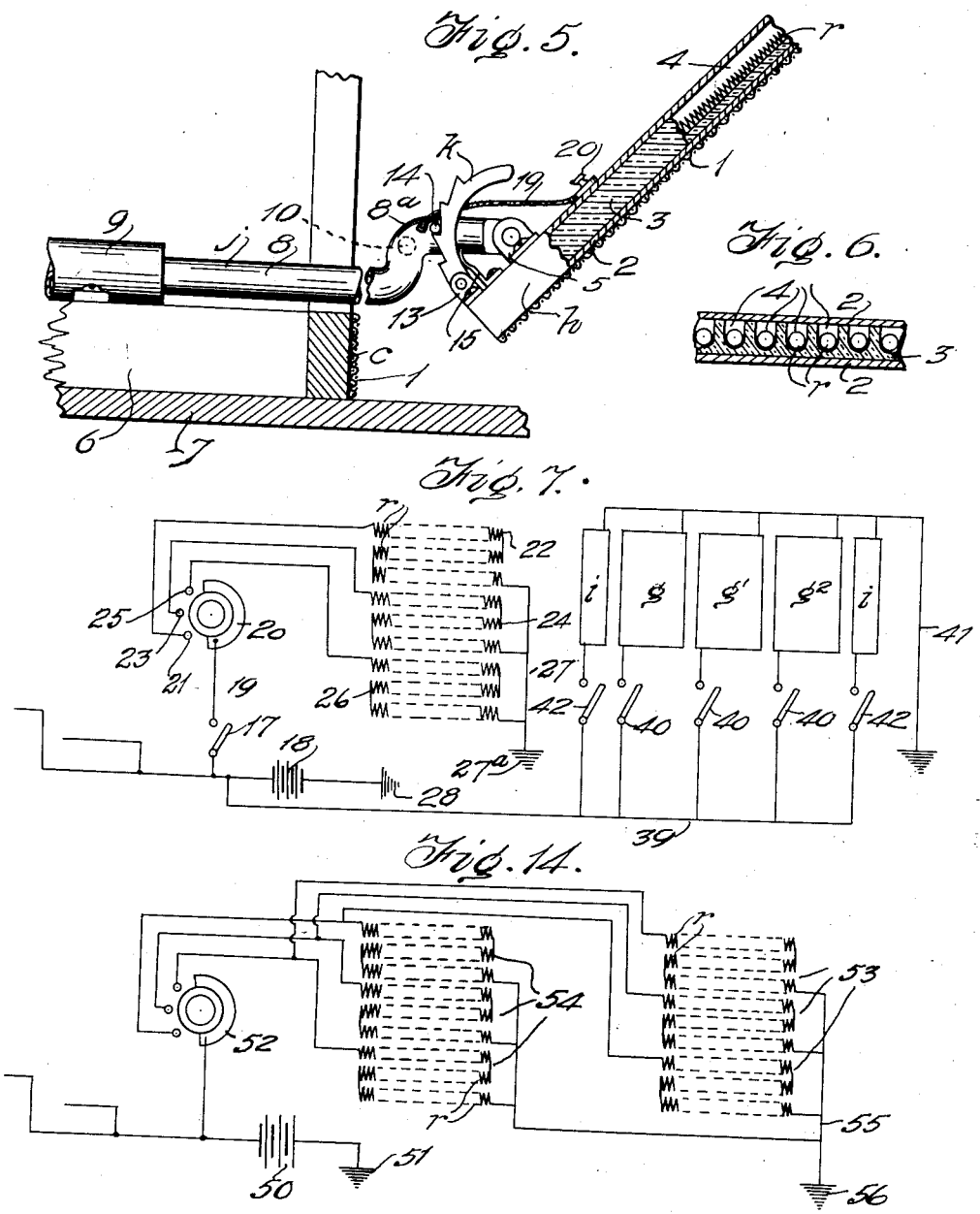
INVENTOR.
Maria A. Arostegui.
BY Robert Watson
ATTORNEY

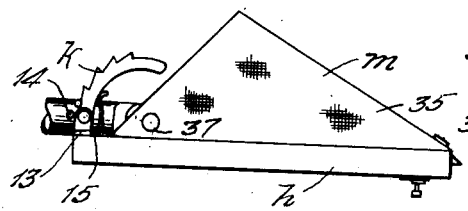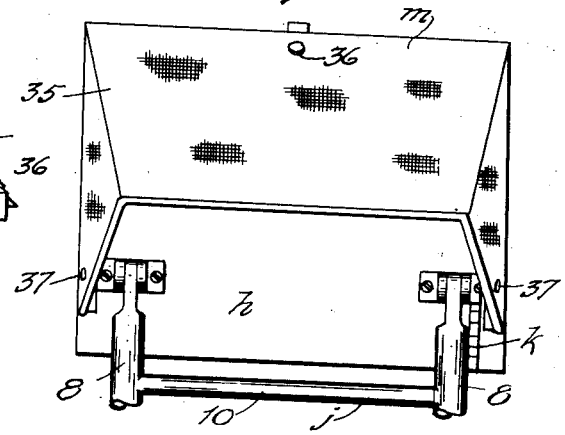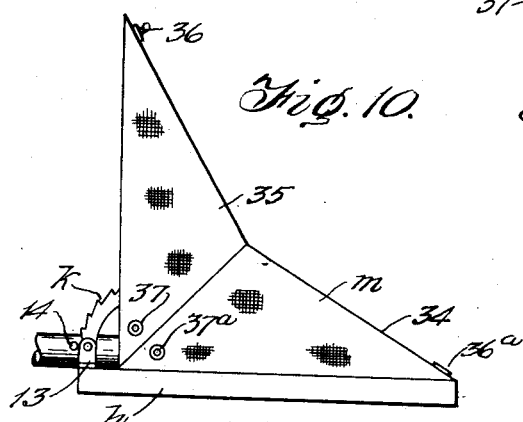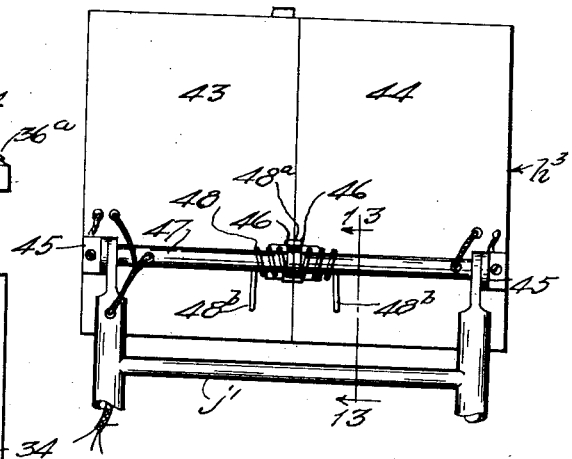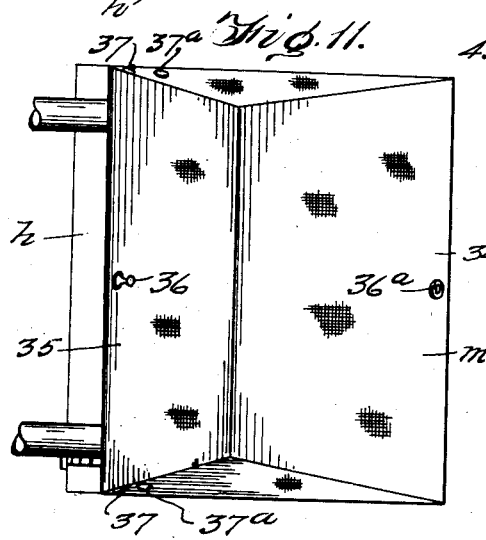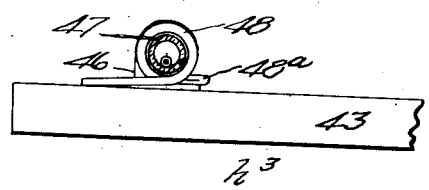

Patented Oct. 5, 1937

2,094,575

UNITED STATES PATENT OFFICE 2,094,575

HEATING MEANS FOR SEATS

Maria A. Aróstegui, Washington, D. C.

Application July 31, 1936, Serial No. 93,696

8 Claims. (Cl. 219—19)

This invention relates to an arrangement of heating devices adapted for use in connection with seats, and more particularly the seats of vehicles.

In the present application, I have shown the invention in connection with electric heating pads associated with an automobile seat whereby any occupant of the seat may turn on and regulate the current flow to one or several pads for supplying warmth to the body of that occupant only, and whereby, if the seat is long enough to seat several passengers side by side, as is usually the case with the back seat of an automobile, each occupant of the seat may control the flow of current through heating pads associated with space which he occupies, to supply the warmth which he may desire, independently of what the other occupants of the seat may desire. Heating pads may be arranged in the back cushions and arms of the chairs where they are not conspicuous, and for supplying heat to the feet and lower limbs of each individual, I provide a pad which normally lies in a vertical plane in an opening in the support of the seat and which may be used in that position, and this pad may be extended in front of the seat and arranged in a horizontal or inclined position to support and supply warmth to the feet of the occupant. A foldable fabric hood, detachably connected to the pad, is provided for covering the feet and, if desired, this hood may be extended upwardly to direct the heat to the legs of the occupant between the knees and ankles. The invention comprises various features of construction which will be more particularly referred to in the following specification.

In the accompanying drawings which illustrate the invention,

Fig. 1 is a front view of a vehicle seat having seating room for several persons and heating pads spaced apart for the individual use of each person;

Fig. 2 is a section on the line 2—2 of Fig. 1, partly broken away, showing one of the adjustable heating pads in its normal position;

Fig. 3 is a section on the line 3—3 of Fig. 2;

Fig. 4 is a side view, on an enlarged scale, of the heating pad and its mountings shown in Fig. 2, the pad being shown in its horizontal position and a foot covering being indicated in dotted lines;

Fig. 5 is a similar view showing the pad in an inclined position, the pad being shown partly in section and its supporting frame being partly broken away;

Fig. 6 is a section through a part of the heating pad on the line 6—6 of Fig. 2;

Fig. 7 is a diagram illustrating the electrical circuits for one of the adjustable heating pads and including circuits for stationary heating pads in the back and arms of the seat;

Fig. 8 is a side view of one of the adjustable heating pads in horizontal position with a flexible foot covering on the pad;

Fig. 9 is a top plan view of the same;

Fig. 10 is a side view, the same as in Fig. 8, with the flexible covering unfolded and extended upwardly;

Fig. 11 is a top plan view of the pad and covering as shown in Fig. 10;

Fig. 12 is a bottom plan view of a modified form of adjustable heating pad comprising two independently movable parts, one for each foot of an individual on the seat;

Fig. 13 is a section on the line 13—13 of Fig. 12, the pad being shown in side view, partly broken away; and, Fig. 14 is a diagram of the circuits for the divided pad shown in Fig. 12.

Referring to Fig. 1 of the drawings, $a$ represents the seat of an automobile, $b$ indicates the cushion thereon and $c$ represents the support for the seat which is usually in the form of a continuous wall extending from the front edge of the seat to the car floor and conforming to the contour of the seat. The back of the seat is indicated at $d$ and the arms at $e$. The back cushion $f$ is shown divided into three panels with heating pads $g$, $g'$, $g^2$ in the several panels and heating pads $i$ may be arranged in the cushions of the arms, as hereinafter referred to.

The front support $c$ for the seat is cut away opposite the several back cushions or panels to provide spaces for a corresponding number of heating pads $h$, $h'$, $h^2$, which fold into said spaces in a vertical plane, flush with the support $c$, and which may be covered with upholstery or decorated the same as the support so as to be inconspicuous, upholstery being indicated at $l$ in Figs. 2 and 5.

The adjustable heating pads are shown in the drawings as being of rectangular form and they are mounted as shown in Figs. 2, 3, 4 and 5. The pads may be variously constructed and each pad is of suitable size to accommodate the feet of a person on the seat when the pad is rocked outwardly as shown in Figs. 4 and 5. For the purpose of illustration, each pad may consist of a suitable casing 2, Figs. 5 and 6, in which is enclosed a flat slab of insulating material 3, such as porcelain, having channels 4 in which are located resistance coils $r$. The pad is provided with ears 5 on its inner side near its lower end, by which it is pivotally connected to a sliding frame *j* suitably mounted on parallel wooden supports 6 secured to the floor 7 of the car. The support comprises parallel rods 8 slidable horizontally forward or backward in tubular guides 9 mounted on the supports, each rod having an upward and forward bend, as indicated at 8ª, and the rods being rigidly connected together at the bends by a cross-rod 10. The ends of the rods 8 are pivotally connected to the ears 5 on the heating pad. The rods 8 are provided with radially projecting guide pins 8ᵇ near their inner ends which project through longitudinal slots 9ª in the guide tubes 9 to prevent any turning movement of the rods. A toothed latch *k*, pivotally mounted in a fitting 13 at the lower end of the pad near one side thereof and below the pivotal axis of the pad, curves rearwardly and upwardly, and its toothed edge is normally pressed into engagement with the locking pin 14 on one of the guide rods 8 by a spring 15.

A knob 16 is suitably arranged on the outer side of the pad, and by pulling this knob forwardly, the pad may be moved forward from its normal position, supported by the sliding frame. Then, by rocking the curved latch forwardly against the action of its spring, the latch will be released from the locking pin and the pad may then be swung downwardly into the horizontal position, as shown in Fig. 4, or it may be set in various inclined positions and will be held in any of such positions by the latch, as illustrated in Fig. 5. After the pad has been pulled out a suitable distance from the seat, the latch may be moved by the foot of the operator or by hand to adjust the angle of the pad. When it is desired to return the pad to its normal position, it is merely necessary to rock it to its vertical position and then push the pad and slide backward. In rocking the pad upwardly, the teeth of the latch slip past the locking pin. A spring latch controlled by knob 16 latches the pad in its vertical position.

Switches 17 are arranged on the support *c*, one switch adjacent each adjustable heating pad at a point where it will be convenient for a person occupying a seat over a heater to turn on or off the electric current. A diagram of the electrical connections for each adjustable pad is shown at the left in Fig. 7, wherein the switch 17 is connected to one pole of the battery 18, and when the switch is closed, the battery is connected through conductor 19 to a switch member 20 mounted on the inner side of the pad, as shown in Fig. 3. The switch member 20 is adjustable to engage stationary contact 21 and thereby connect resistance coils 22 in the circuit for mild heat, or to engage also contact 23 and connect coils 24 in parallel with coils 22 in the circuit, to obtain increased heating effect, or to engage also contact 25 to connect coils 26 in parallel with coils 22 and 24, to obtain the greatest heating effect. These coils are connected by conductor 27 to ground, as indicated at 27ª, and one pole of the battery is also grounded in the usual manner, as indicated at 28 in the diagram. In Fig. 2, the insulated conductor 19 is shown extending from the switch 17 through the hollow bar 8 of the frame to the switch 20, and the ground connection 27 of the coils (Fig. 3) extends to the metal guide 9 which may be grounded on the frame of the machine, as indicated at 27ª. A person sitting above one of the adjustable pads, as for instance the pad *h*, may turn the current on at the switch 17 while the pad is in its normal vertical position, and heat will be applied to the legs of that person, but not to the feet. If it is desired to use the pad as a foot warmer, it will be moved forward and rocked downwardly to the horizontal position, as shown in Fig. 4, or set at a suitable inclination to the horizontal position, as illustrated in Fig. 5. This latter arrangement is desirable for persons having long limbs. The degree of heat will be determined by the setting of the switch 20, which may be adjusted as desired. One passenger may use the heater adjacent his portion of the seat, while another passenger may not want to use the heater adjacent the latter's portion of the seat, or they may want to use the heaters in different ways and with different degrees of heat, and the invention provides for this.

A detachable fabric foot covering or hood *m* is shown in dotted lines in Fig. 4 and in full lines in Figs. 8–11, inclusive. This covering is composed of two similar triangular parts 34 and 35, Fig. 10, the part 35 adapted to fold down over the part 34 and to be fastened thereto by clasps 36—36ª, 37—37ª, as shown in Figs. 8 and 9. When folded, the feet of the passenger my be inserted in the covering from the rear end of the heater pad and the heat will be applied to the feet and ankles of the passenger when the current is turned on. When the pad 35 is unclasped, it may be extended upwardly as shown in Figs. 10 and 11 to convey the heat to the limbs of the passenger between the ankles and the knees.

In Fig. 1, and at the right in Fig. 7, the circuits for the pads *g* in the back cushions of the seats and the pads in the arms of the seats are shown. A conductor 39 connects one pole of the battery to the independent switches 40, which, when closed, connect the resistance coils in the pads to the battery, and these coils are connected to a common grounded return wire 41. Switches 42, when closed, connect the heaters in the arms of the seats to the conductor 39, and these heaters are also connected by conductor 41 to ground. It will be evident that each passenger may operate the heaters adjacent his portion of the seat independently of the other heaters.

A modification of the adjustable heater pad is shown in top plan view in Fig. 12. In this view, the pad $h^3$ is shown in two parallel parts 43 and 44, one for each foot. These are independently pivoted to the frame *j'*. As shown, each part has bearings 45 and 46 at its opposite edges and in alinement with one another and a tubular bar 47 on the frame extends through these bearings. An equalizing spring 48 coiled in opposite directions about the tube 47 and having its central portion 48ª resting on the flanges of the bearings 46 and its end portions 48ᵇ resting on the parallel parts 43 and 44 tends to rock the pads to the vertical position. The passenger placing one foot on each pad may press the pads to the horizontal position or may allow the pads to assume different positions. The electrical connections to the pads may be grounded through the tubes of the frame. In Fig. 14, a diagram of connections suitable for a two-part pad is shown. In this view, the battery 50 has one pole connected to ground at 51 and a switch 52 is connected to the opposite pole of the battery. This switch may be the same as that shown in Fig. 7. Three groups of coils 53 are shown for one part 44 of the pad $h^3$ and another group of coils 54 is shown for the part 43 of the pad $h^3$ and these coils for the two parts of the pad are connected in multiple and connected by conductor 55 to ground at

56. By adjusting the switch 52, the coils in both parts of the pad will be connected to the battery.

As the pads at the back and in the arms of the seat are concealed by the upholstery, and as the adjustable heaters fold into recesses in the support for the seat and may be covered with upholstery, the appearance of the car is not marred by the presence of the heaters. The movable heaters may be used as foot rests even when heating is not desired, and as the movable heaters can be pushed forward or backward and held at various inclinations, the positions of the heaters can be adjusted to suit tall or short persons or persons sitting in various positions, thus adding to the comfort of the passengers at all times. While the adjustable pads are shown associated with the back seat of an automobile, heaters may be similarly arranged in the back of the driver's seat for the use of persons occupying folding seats in the car between the back seat and the driver's seat.

What I claim is:

1. The combination with a seat having a supporting wall for its forward part and a recess in said wall, of a heating pad pivotally mounted beneath said forward part and adapted to extend upwardly from its pivotal axis and lie in a vertical plane in said recess and being movable about its pivotal axis from said vertical position toward a horizontal position.

2. The combination with a seat having a supporting wall for its forward part and a recess in said wall, of a heating pad pivotally mounted beneath said forward part and adapted to extend upwardly from its pivotal axis and lie in a vertical plane in said recess and being movable about its pivotal axis from said vertical position toward a horizontal position, and means for holding said pad in various positions of angular adjustment.

3. The combination with a seat of a frame slidingly mounted in suitable guideways beneath the seat for forward and backward horizontal movement and a heating pad pivotally mounted on the frame for movement about a horizontal axis transverse to the line of movement of the frame from a vertical toward a horizontal position.

4. The combination with a seat of a frame slidingly mounted in suitable guideways beneath the seat for forward and backward horizontal movement and a heating pad pivotally mounted on the frame for movement about a horizontal axis transverse to the line of movement of the frame from a vertical toward a horizontal position, and means for holding said pad in various positions of angular adjustment.

5. The combination with a seat having a supporting wall for its forward edge and a recess in said wall, of a frame beneath the seat movable forwardly and backwardly, and a heating pad pivoted to the frame and adapted to lie in a vertical plane in said recess in the rearmost position of the frame and being movable toward a horizontal position when the frame is moved forwardly.

6. The combination with a seat of a length suitable for seating several persons and having a supporting wall for its forward edge and recesses in said wall spaced horizontally apart, of a plurality of heating pads independently pivoted to swing about an axis extending longitudinally of the seat from a vertical toward a horizontal position, each pad adapted to fit into one of said recesses when the pad is in the vertical position.

7. The combination with a seat of a length suitable for seating several persons and having a supporting wall for its forward edge and recesses in said wall spaced horizontally apart, of a plurality of heating pads independently pivoted to swing about an axis extending longitudinally of the seat from a vertical toward a horizontal position, each pad adapted to fit into one of said recesses when the pad is in the vertical position, a switch on the support adjacent each recess for connecting the pad to a current source, and a switch on each pad for adjusting the flow of current to the pad.

8. The combination with a seat of a pivoted heating pad adapted to support the feet of a person occupying the seat, said pad comprising two parallel parts, one part for each foot, and an equalizing spring normally holding said parts in the same plane and permitting the parts to be rocked independently of one another to different positions.

MARIA A. ARÓSTEGUI.